US008301306B1

(12) United States Patent
Boos et al.

(10) Patent No.: US 8,301,306 B1
(45) Date of Patent: Oct. 30, 2012

(54) CONTROL SYSTEM FOR MACHINE THAT CLEANS DRUMS OF READY MIXED CONCRETE TRUCKS

(75) Inventors: Frederick A. Boos, Temple Terrace, FL (US); Scott F. Boos, Tampa, FL (US); William D. Kerr, Riverivew, FL (US)

(73) Assignee: Blasters, LLC, Tampa, FL (US)

( * ) Notice: Subject to any disclaimer, the term of this patent is extended or adjusted under 35 U.S.C. 154(b) by 281 days.

(21) Appl. No.: 12/839,781

(22) Filed: Jul. 20, 2010

(51) Int. Cl.
*G05B 15/00* (2006.01)
*B08B 1/00* (2006.01)
*B08B 7/04* (2006.01)
*B08B 3/00* (2006.01)

(52) U.S. Cl. ............... 700/280; 134/14; 134/18; 134/34

(58) Field of Classification Search .................. 700/280; 134/14, 18, 34
See application file for complete search history.

(56) References Cited

U.S. PATENT DOCUMENTS 3,985,572 A * 10/1976 Petermann et al. ............. 134/34
4,857,113 A * 8/1989 Hodge ............................ 134/32
RE35,010 E * 8/1995 Price ................................. 222/1
5,437,295 A * 8/1995 Brown et al. ................... 134/37
5,511,727 A * 4/1996 Heren et al. .................. 239/242
6,644,325 B2 * 11/2003 MacNeil et al. ........... 134/22.12
6,897,388 B2 * 5/2005 Greer ............................ 200/200
7,056,390 B2 * 6/2006 Fratello et al. .................. 134/18
7,546,843 B2 * 6/2009 Boos et al. ................ 134/166 R
2008/0142042 A1 * 6/2008 Bramsen ......................... 134/18

* cited by examiner

*Primary Examiner* — Mohammad Ali
*Assistant Examiner* — Sivalingam Sivanesan
(74) *Attorney, Agent, or Firm* — Ronald E. Smith; Smith & Hopen, P.A.

(57) ABSTRACT

A control apparatus for an apparatus that cleans the drum of a ready mixed concrete truck includes a CAN-bus control system that includes a nozzle lance position encoder, a boom position encoder, a human-machine interface, a programmable logic controller, and monitors for an engine, hydraulic valves, and pressure sensors. The nozzle lance position encoder includes a rotary encoder, a bi-directional motor, a nozzle lance including a nozzle adapted to discharge water under high pressure, and a swivel assembly to which the nozzle lance is mounted for reciprocating motion. The programmable logic controller enables an operator to control the range of oscillation of the nozzle lance by inputting a desired range of oscillation into the programmable logic controller. An operator can also control extension and retraction of an elongate boom by inputting a desired rate of extension and retraction into the programmable logic controller.

3 Claims, 11 Drawing Sheets

CONTROL SYSTEM FOR MACHINE THAT CLEANS DRUMS OF READY MIXED CONCRETE TRUCKS

BACKGROUND OF THE INVENTION

1. Field of the Invention

This invention relates, generally, to cleaning the drums of ready mixed concrete trucks. More particularly, it relates to a control system for operating an apparatus that performs such cleaning.

2. Description of the Prior Art

U.S. Pat. No. 7,546,843 discloses a machine or apparatus that uses water under pressure to blast green or hardened concrete from the inside of a drum of a ready mixed concrete truck. That patent is incorporated herein by reference. The machine disclosed in that patent uses a moderate horsepower engine because it positions the water-emitting nozzle in very close proximity to the concrete being removed by following the peaks and valleys of the mixer drum. This distinguishes it from earlier machines that use high pressure water and high flow thus high horsepower engines because they position the nozzle on the axis of rotation of the drum and have no means for positioning the nozzle closer to the concrete.

A bell crank is used to oscillate the nozzle in the patented invention. The bell crank can be mechanically adjusted to change the angle of sweep of the nozzle but such adjustment is time-consuming.

Thus there is a need for an improved method of changing the angle of sweep of the nozzle.

The oscillating nozzle is mounted to the leading end of an elongate boom. The rate of elongate boom extension into the interior of the drum and retraction from said interior is controlled by an operator who visually observes the rate of extension and retraction by observing the rate of rotation of a circular disk mounted on the machine and increases or decreases such rate using an analog control system.

Thus there is a need for an improved control system that enables an operator to control the extension and retraction rates of the elongate boom by digital means so that the rotating disk and analog control system are not needed.

However, in view of the art considered as a whole at the time the present invention was made, it was not obvious to those of ordinary skill in the art how the needed improvements could be provided.

SUMMARY OF THE INVENTION

The long-standing but heretofore unfulfilled need for an improved control system for machines that clean the drums of ready mixed concrete trucks is now met by a new, useful, and non-obvious invention.

A preferred embodiment of the novel control apparatus includes a rotary encoder having an output shaft and an encoder sprocket mounted on the rotary encoder output shaft for conjoint rotation therewith. The rotary encoder is used to measure the position of a nozzle lance that emits high pressure water.

However, the invention is not limited to use of a rotary encoder. For example, a linear potentiometer mounted on a hydraulic cylinder that moves the nozzle lance back and forth could be used instead of a rotary encoder. Moreover, instead of a hydraulic cylinder, the nozzle lance could be oscillated by pneumatic, electrical, or other suitable means as well.

The preferred embodiment of the novel apparatus further includes a bi-directional motor having an output shaft and a bi-directional motor sprocket mounted on the bi-directional motor output shaft for conjoint rotation therewith.

The nozzle lance includes a nozzle adapted to discharge water under high pressure and is adapted for fluid communication with a source of water under high pressure.

A swivel assembly has an output shaft to which the nozzle lance is mounted for reciprocating movement in a substantially vertical plane about a horizontal axis and a swivel assembly sprocket is mounted to the swivel assembly output shaft for conjoint rotation therewith.

The bi-directional motor sprocket and said swivel assembly sprocket are in laterally disposed relation to one another. A sprocket chain meshingly engages the bi-directional motor sprocket and the swivel assembly sprocket to form a loop-shaped path of travel so that the sprocket chain rotates in a first direction when the bi-directional sprocket and the swivel assembly sprocket rotate in a first direction and in a second direction opposite to the first direction when the bi-directional sprocket and the swivel assembly sprocket rotate in a second direction opposite to the first direction.

The encoder sprocket meshingly engages the sprocket chain. A programmable logic controller (PLC) is in electrical communication with the encoder. To control the rate of oscillation of the nozzle lance, a user inputs a desired stroke rate into the PLC and the PLC takes the measured velocity as reported by the rotary encoder or linear potentiometer and compares the desired stroke rate with the actual stroke rate and adjusts the hydraulic valve, or other suitable valve, accordingly. A closed loop controller such as a proportional, integral, and derivative controller (PID) controls the speed of the oscillation.

To control the range of oscillation of the nozzle lance, a user inputs a desired range into the PLC and the PLC compares the measured position as reported by the rotary encoder or linear potentiometer with the desired position and controls the bi-directional hydraulic or other suitable motor accordingly. A closed loop controller such as a proportional, integral, and derivative (PID) controller controls the range of the oscillation.

The novel control apparatus also includes an elongate boom and a housing through which the elongate boom extends. A bi-directional hydraulic or other suitable motor is mounted on the housing and has an output shaft. A boom position rotary encoder is mounted on the output shaft for conjoint rotation therewith. A pinion gear is also mounted on the output shaft. A rack gear is mounted to the elongate boom and the rack gear meshingly engages the pinion gear so that rotation of the pinion gear in a first direction effects linear motion of the elongate boom in a first direction and rotation of the pinion gear in a second direction effects linear motion of the elongate boom in a second direction opposite to the first direction.

A programmable logic controller is in electrical communication with the bi-directional motor and the rotary encoder. The user inputs into the PLC a desired extension or retraction rate for the boom, together or separately. The PLC controls the speed of the boom by opening and closing a proportional hydraulic valve to achieve the desired speed. The control means further includes a closed loop controller such as a proportional, integral, and derivative controller (PID) that controls the speed of retraction.

The rate of extension into the drum is of less importance because the nozzle lance emits water normally during the retraction of the elongate boom. A user will therefore usually insert the elongate boom into the drum at or near its fastest possible rate.

An important object of this invention is to provide control means for controlling the oscillation rate and range of a nozzle lance that forms a part of a machine that cleans concrete from a ready mixed drum.

An equally important object is to provide control means for controlling the retraction rate of an elongate boom that forms a part of such machine.

Another important object is to provide a human-machine interface that facilitates a user's control of the machine.

These and other important objects, advantages, and features of the invention will become clear as this description proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the following detailed disclosure, taken in connection with the accompanying drawings, in which.

DETAILED DESCRIPTION OF THE PREFERRED EMBODIMENT

Figure 1:
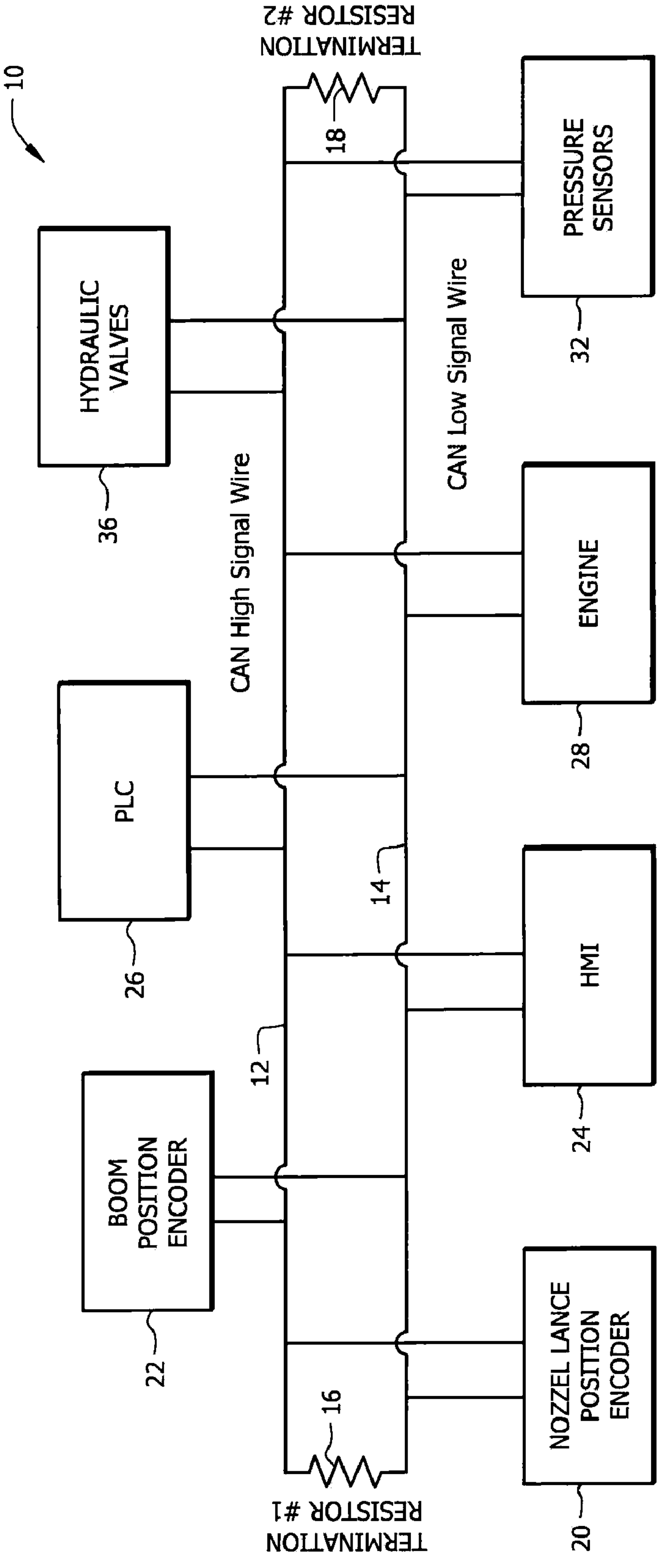
FIG. 1 is a diagram of the novel CAN-bus layout.

FIG. 1 depicts an illustrative embodiment of the novel control system which is denoted as a whole by the reference numeral 10.

Novel control system 10 is a CAN-bus control system that includes high signal wire 12, low signal wire 14, first termination resistor 16, and second termination resistor 18.

Nozzle lance position encoder 20, boom position encoder 22, human-machine interface (HMI) 24, programmable logic controller (PLC) 26, engine 28, hydraulic valves 30, and pressure sensors 32 are respectively connected to said high and low signal wires as depicted.

Figure 2:
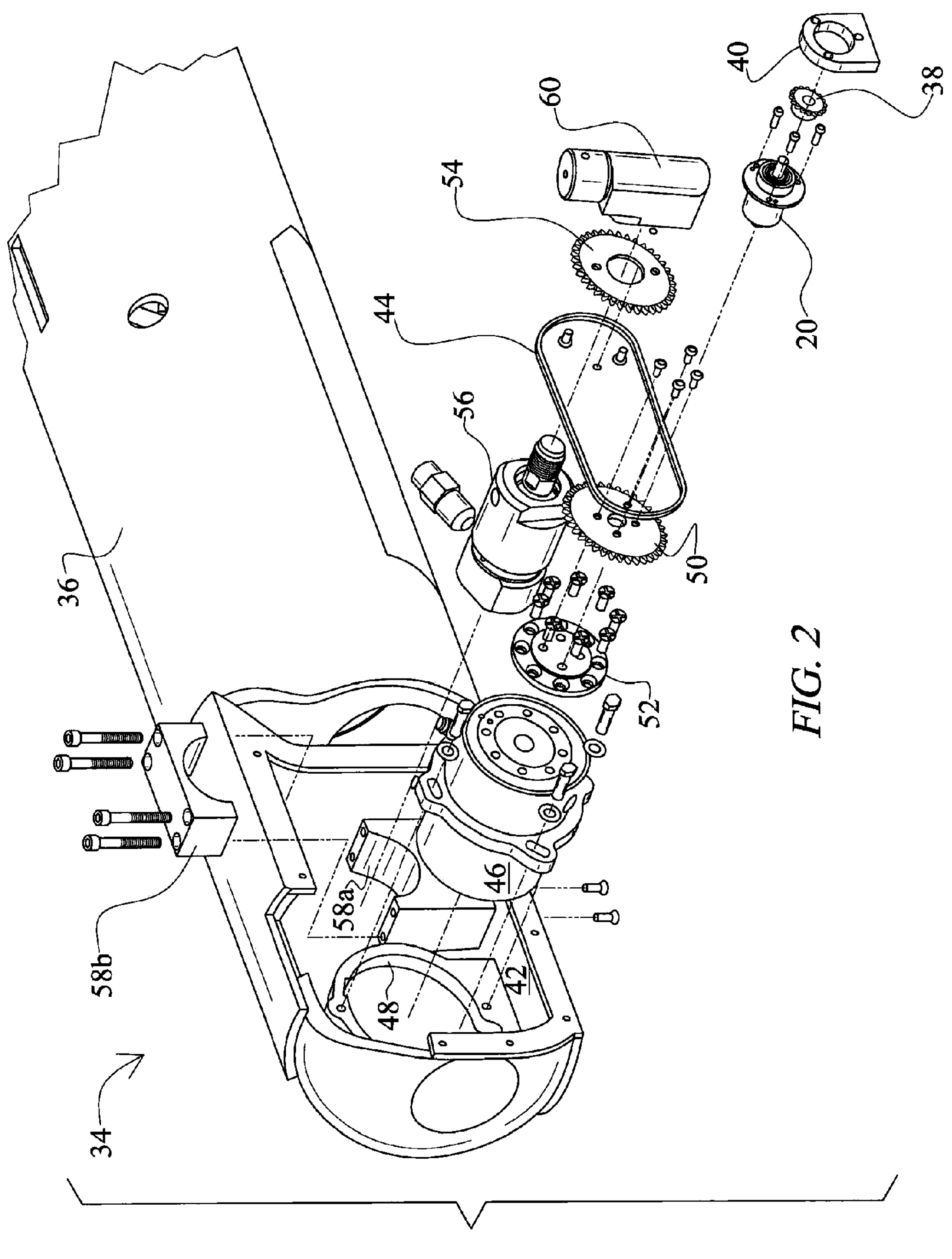
FIG. 2 is an exploded view of the novel nozzle lance position encoder assembly.
Figure 3:
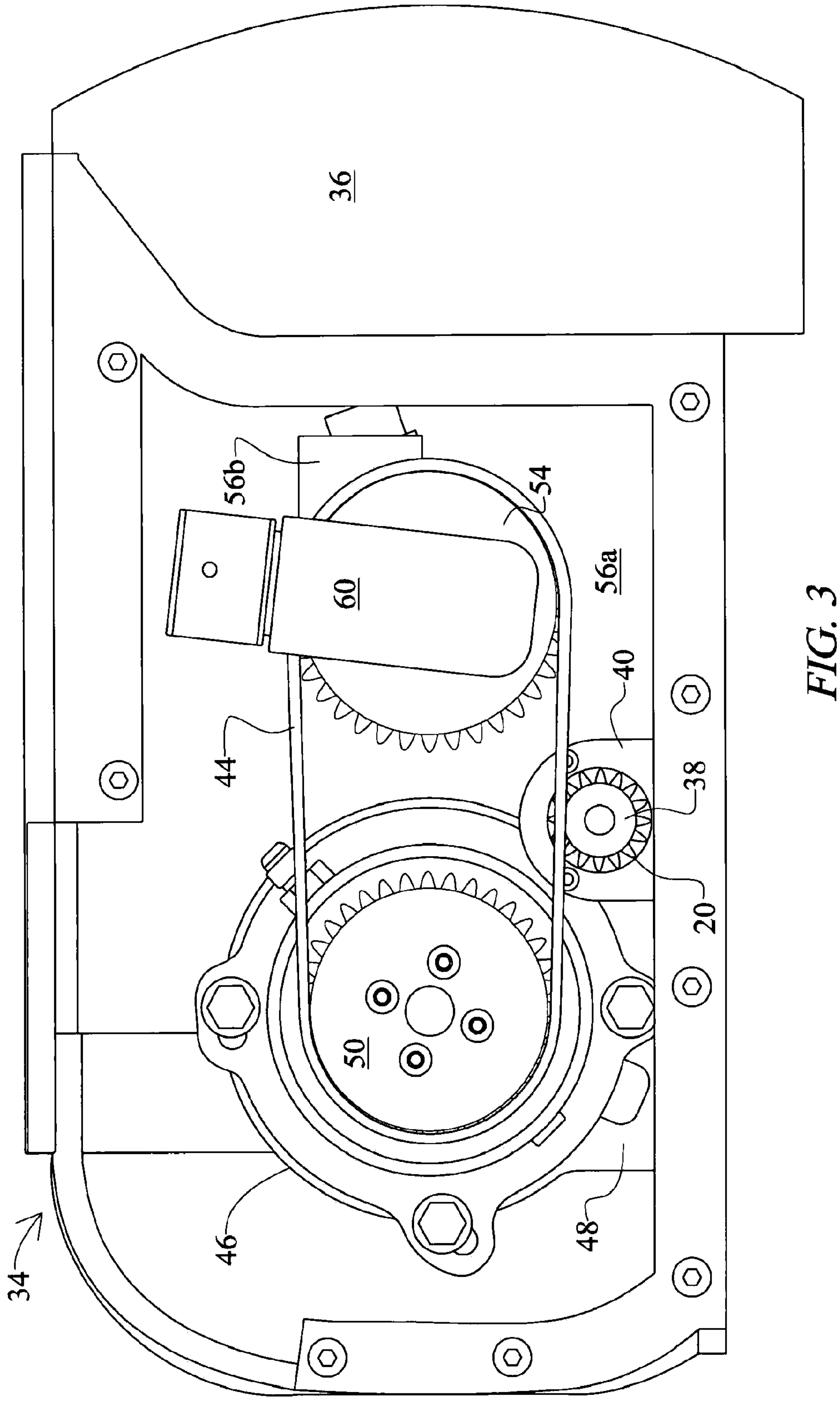
FIG. 3 is a side elevational view of said nozzle lance position encoder assembly.
Figure 4:
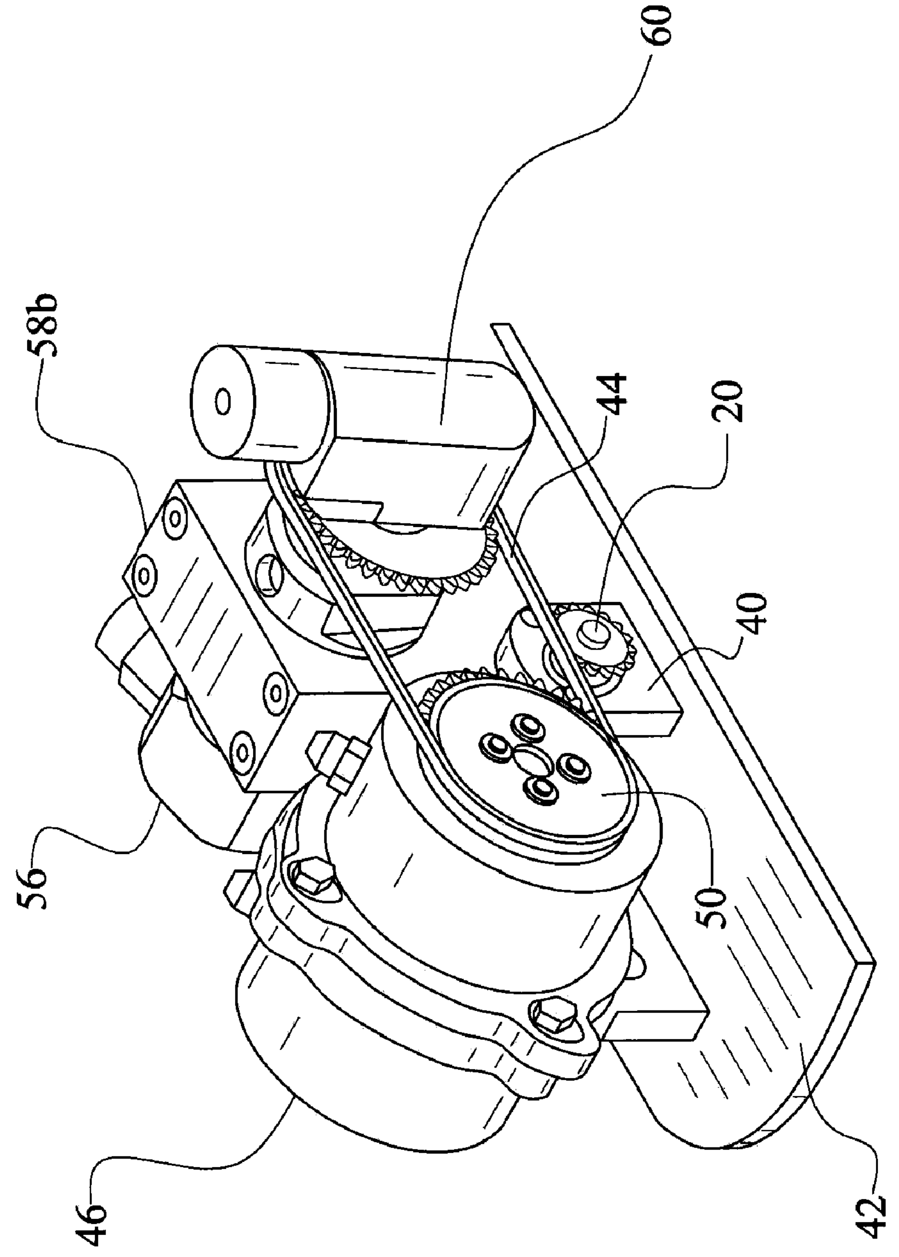
FIG. 4 is a perspective view of said nozzle lance position encoder assembly.

The mechanical means that replaces the bell crank of the prior art includes encoder 20 that is under the control of PLC 26. As depicted in FIGS. 2-4, the illustrative mechanical means for reciprocating the nozzle lance or lance is denoted as a whole by the reference numeral 34.

Encoder 20 is depicted near the lower right corner of said FIG. 2 and is mounted in the hollow interior of torpedo 36, denoted at the top center of said Fig.

Torpedo 36 is hingedly connected to the leading end of an elongate boom, not depicted, that is inserted into the hollow interior of a ready mixed concrete truck drum to perform a cleaning operation that removes concrete from the interior walls of the drum of the truck as more fully set forth in the incorporated patent.

More particularly, encoder 20 includes encoder sprocket 38 as depicted and said encoder is mounted within apertured bracket 40 that is mounted on flat plate 42 that is mounted in the interior of torpedo 36 at its closed leading end. Encoder sprocket 38 meshingly engages the teeth formed in chain 44 so that chain 44 rotates in a first direction when encoder sprocket 38 rotates in a first direction and in a second direction opposite to the first direction when encoder sprocket 38 rotates in a second direction opposite to the first direction.

Bi-directional motor 46 is mounted on bracket 48 that is also mounted on flat plate 42. Motor sprocket 50 is secured to motor hub 52 which is secured to motor 46. Motor sprocket 50 engages a first end of chain 44.

The second end of chain 44 engages swivel assembly sprocket 54 that is secured to swivel assembly 56. Swivel assembly 56 is mounted in sandwiched relation between saddle base 58*a* and saddle cap 58*b*.

Lance assembly 60 is secured to swivel assembly sprocket 54 and the second end of chain 44 wraps around said swivel assembly sprocket 54.

Bi-directional motor 46 receives its instructions from PLC 26. If the operator wants lance assembly or nozzle lance 60 to oscillate sixty degrees (60°), i.e., thirty degrees) (30° to either side of its centered position, the operator inputs that information to the PLC.

Rotary encoder 20 publishes the parameters of position and angular velocity.

To control the rate of oscillation of nozzle lance 60, a user inputs a desired stroke rate into the PLC and the PLC compares the measured velocity as reported by rotary encoder 20 and compares it with the desired stroke rate and adjusts the hydraulic valve accordingly. A proportional, integral, and derivative controller (PID) loop controls the speed of the oscillation.

To control the range of oscillation of nozzle lance 60, a user inputs a desired range into PLC 26 and said PLC compares the measured position as reported by rotary encoder 20 with the desired range and controls bi-directional hydraulic motor 46 accordingly. A closed loop controller such as a proportional, integral, and derivative (PID) controller controls the range of oscillation.

Motor sprocket 50 is the driving sprocket and swivel assembly sprocket 54 and encoder sprocket 38 are the driven sprockets.

Gears could be substituted for the sprocket and chain drive that is depicted, e.g., a spur or other type of gear could be mounted to the output shaft of the encoder and that gear could engage a gear train that causes oscillation of the nozzle lance. A direct driven swivel, and any other equivalent mechanical means for controlling said oscillation, such as an electric servo drive, a pneumatic motor, an electric motor, or the like could be substituted for the control means that is depicted.

Figure 6:
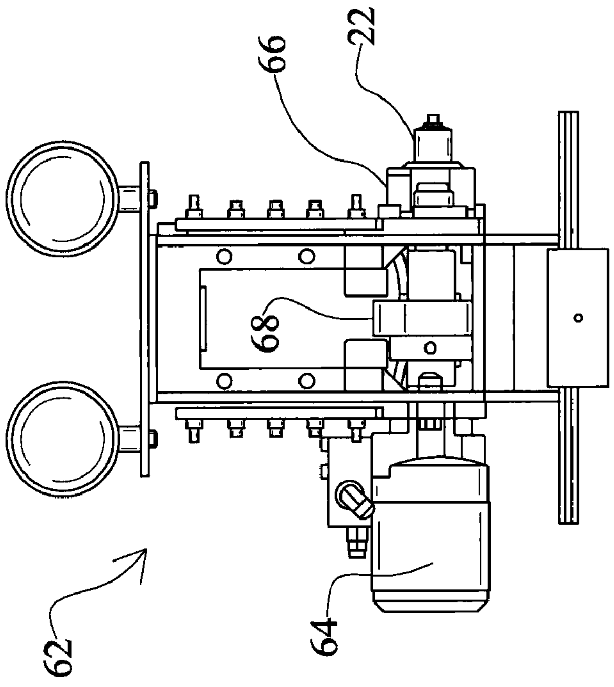
FIG. 6 is a sectional view of the assembly of FIG. 5.
Figure 5:
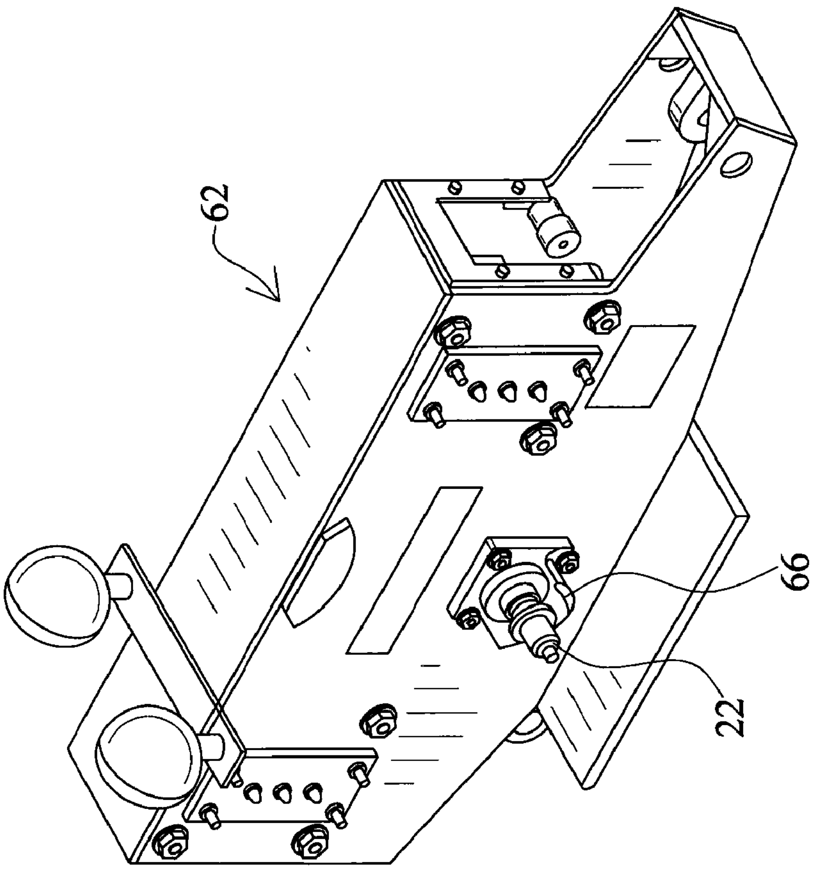
FIG. 5 is a perspective view of a hydraulic motor mount assembly.

Boom position encoder 22 is depicted in FIGS. 5 and 6. Reference numeral 62 in said Figs. indicates a hydraulic motor housing although other suitable and equivalent motors are within the scope of this invention. Hydraulic motor 64 is mounted to hydraulic motor housing 62 as best depicted in FIG. 6 and boom position encoder 22 is mounted on the output shaft of said hydraulic motor by bracket 66.

Pinion gear 68 is mounted within the hollow interior of housing 64 and engages an elongate rack gear, not depicted, so that linear retraction and extension of said elongate rack gear is effected by rotation of said pinion gear 68 in opposite directions under the control of hydraulic motor 64. Hydraulic motor 64 is under the control of PLC 26 through encoder 22.

The elongate rack gear is secured to and causes conjoint travel of the elongate boom that is inserted into and retracted from the hollow interior of a ready mixed concrete drum during a cleaning operation as set forth in the incorporated patent.

The user inputs into PLC 26 a desired extension or retraction rate for the boom. PLC 26 controls the speed of the boom by comparing the operator-input desired rate and the actual, encoder-measured rate and opening and closing a proportional hydraulic valve as needed to bring the measured speed to the desired speed. The control means further includes a PID loop to control the speed of extension or retraction.

PLC 26 also enables a user to develop a cleaning plan for each drum. The leading end of a fifteen feet (15') in length drum may have minimal concrete build-up for an extent of five feet (5'), for example, followed by a heavy build-up in the center of the drum for an extent of five feet (5'), followed by a final five feet (5') of light build-up at the trailing end of the drum. The user inputs this information into PLC 26. The PLC adjusts the boom retraction rate and the nozzle lance oscillation rate to optimize the cleaning times for such conditions. In this example, the retraction rate could be about ten inches per minute (10"/min) for the first five feet, three inches per minute (3"/min) for the middle five feet and the last five feet could be at eight inches per minute (8"/min.). The dwell time is thus optimized for each set of conditions in the drum, thereby conserving energy and reducing cleaning times.

Figure 7:
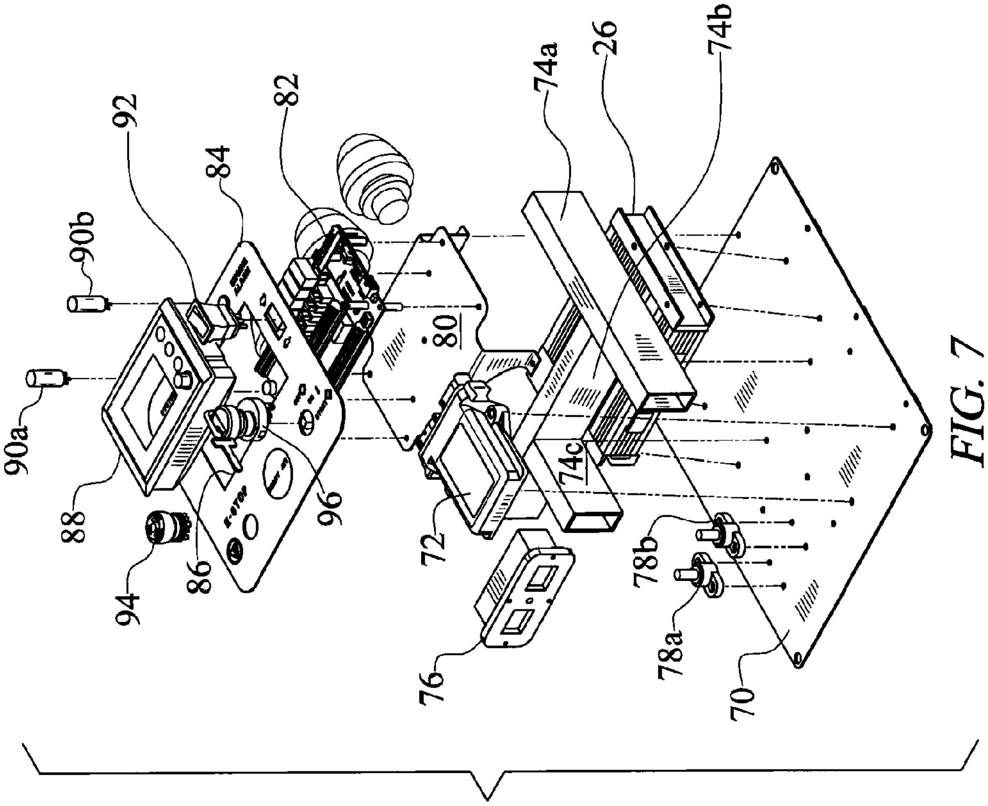
FIG. 7 is a fully exploded view of the control panel assembly.
Figure 8:
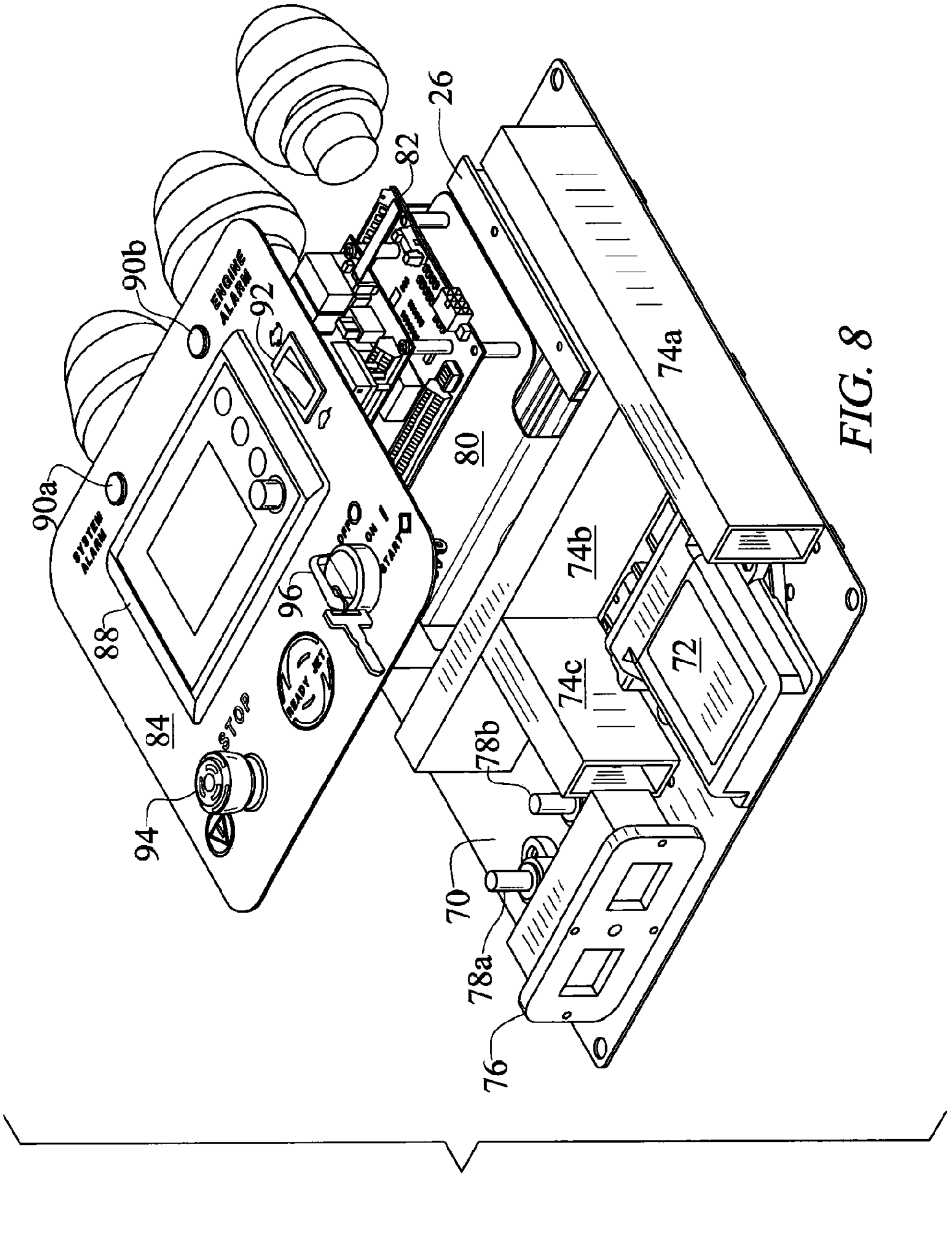
FIG. 8 is a partially exploded view of the control panel assembly.

As best understood in connection with FIGS. 7 and 8, the parts that collectively form HMI 24 are mounted directly or indirectly onto control panel assembly 70.

The directly mounted parts include the PLC 26 with proprietary programming, receiver 72, wire ducts 74*a*, 74*b*, and 74*c*, connector 76, junction blocks 78*a*, 78*b*, and a custom printed circuit board (PCB) bracket 80 that overlies PLC 26.

PCB 82 is supported by said PCB bracket 80 and overlay 84 having rectangular aperture 86 formed therein overlies said bracket. Display 88 is accommodated by said aperture. Additional apertures formed in overlay 84 accommodate red LEDs 90*a* (system alarm), 90*b* (engine alarm), on-off rocker switch 92, emergency stop switch 94, and main switch 96.

Figure 9C:
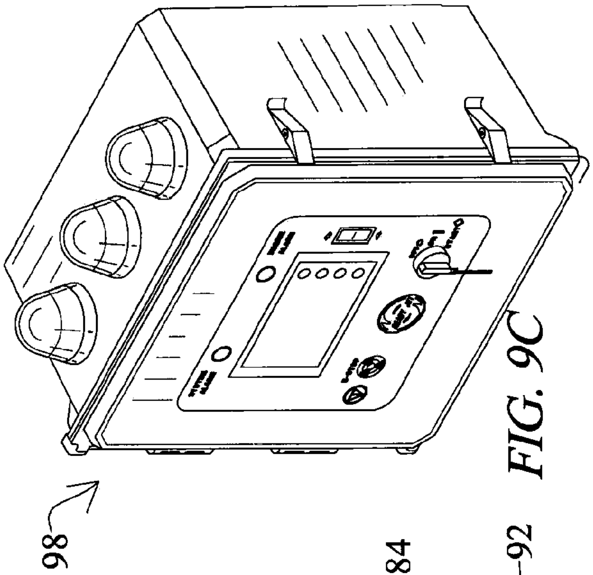
FIG. 9C is a perspective view of said control panel.
Figure 9A:
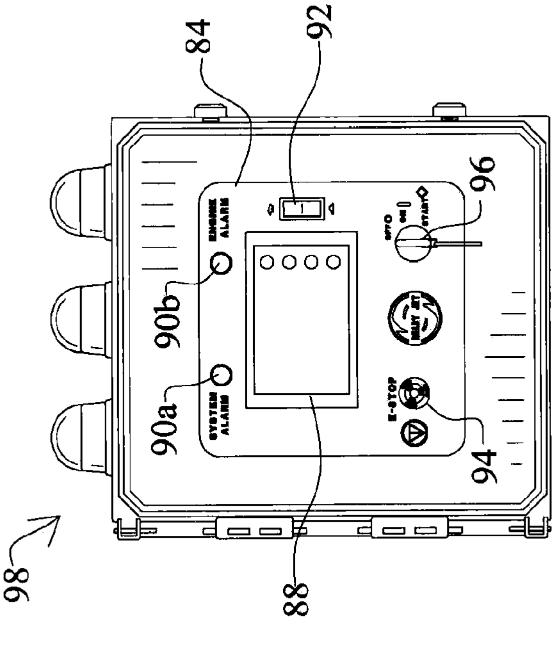
FIG. 9A is a front elevational view of the control panel assembly that includes the human machine interface, components.
Figure 9B:
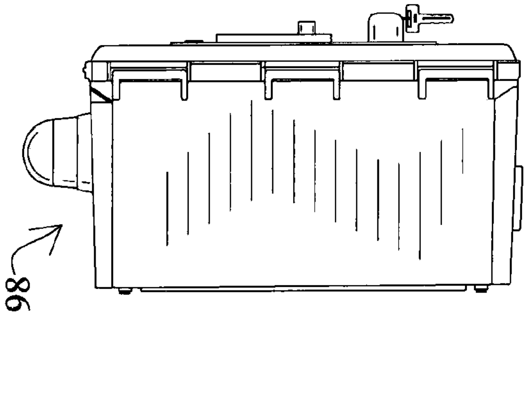
FIG. 9B is a side elevational view of said control panel.

Panel enclosure 98 that encloses HMI 24 is depicted in front elevation in FIG. 9A, side elevation in FIG. 9B, and in perspective in FIG. 9C.

Figure 10A:
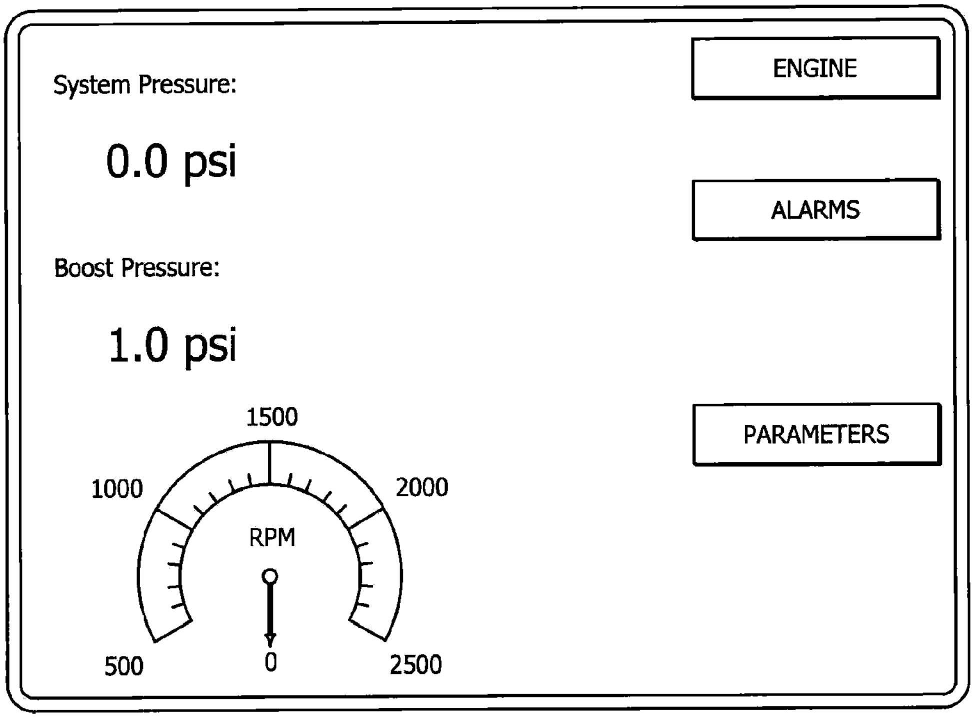
FIG. 10A is a first display screen.
Figure 10B:
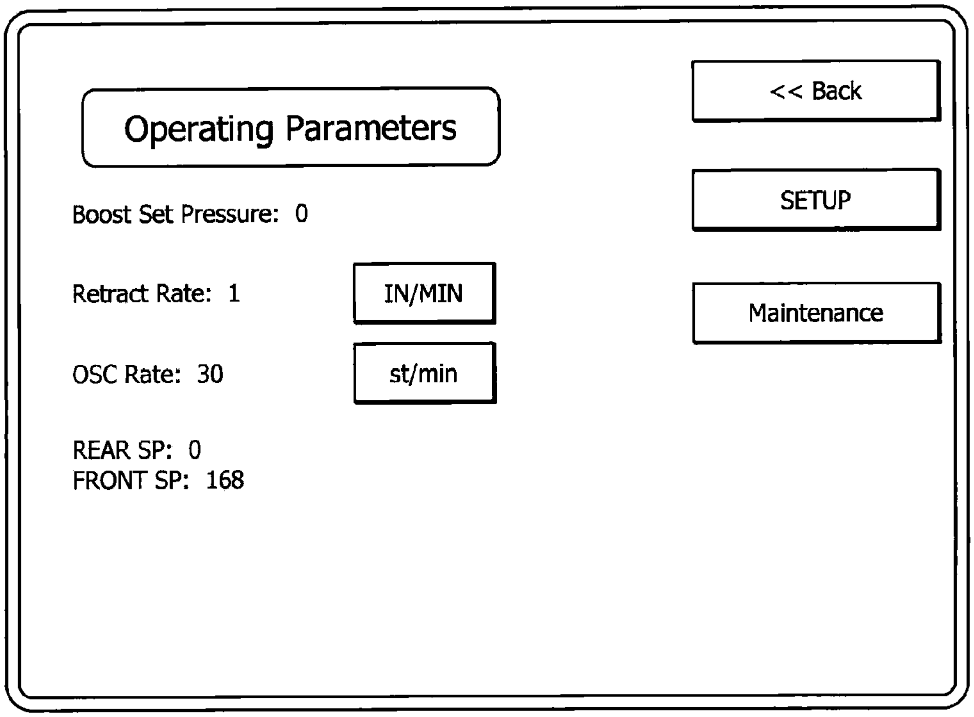
FIG. 10B is a second display screen.
Figure 10C:
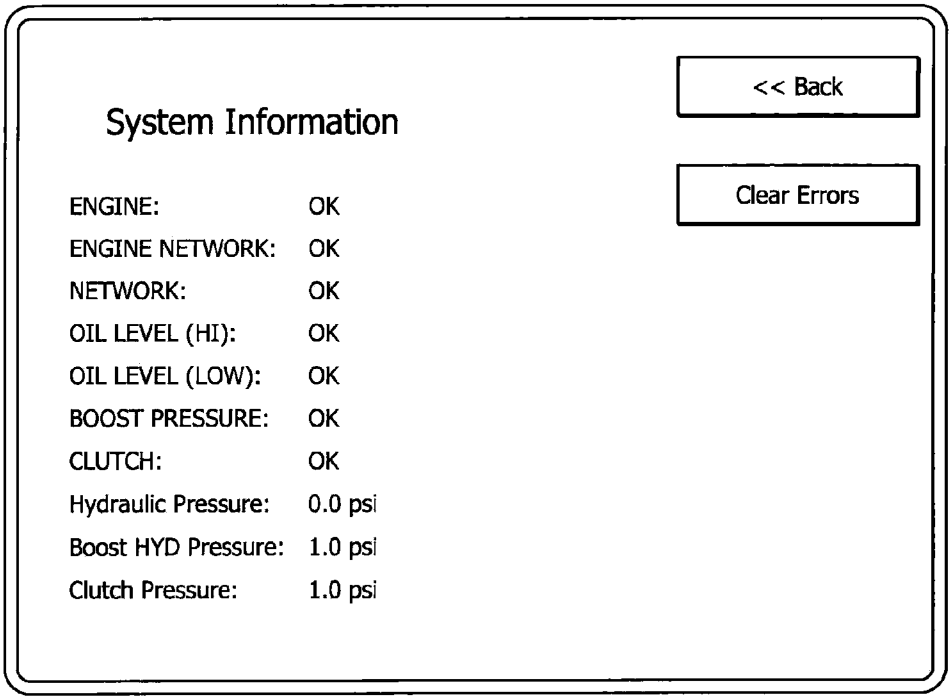
FIG. 10C is a third display screen.
Figure 10D:
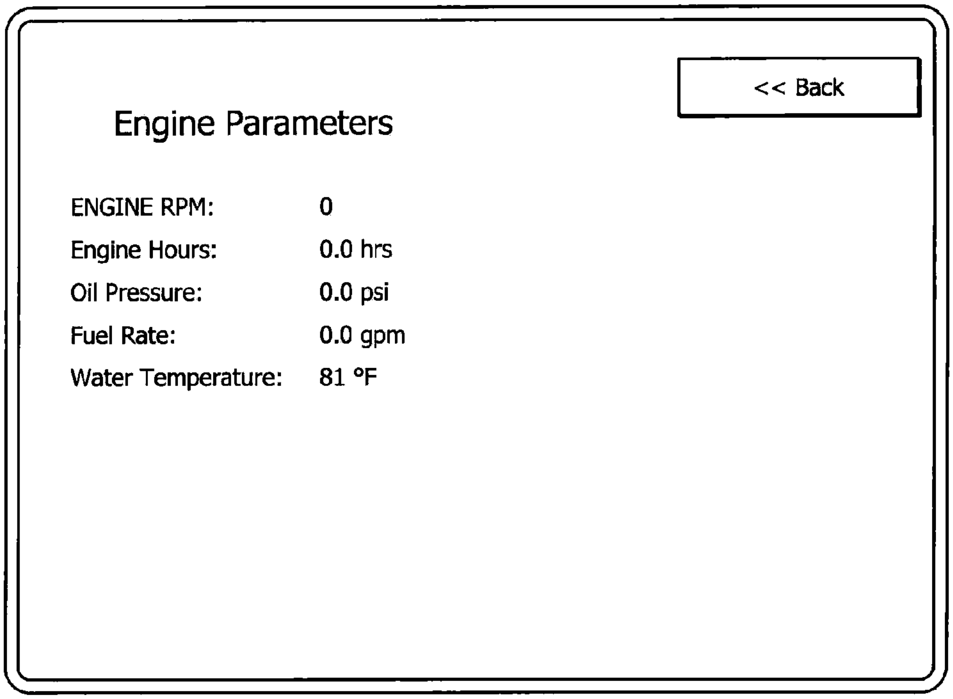
FIG. 10D is a fourth display screen.
Figure 10E:
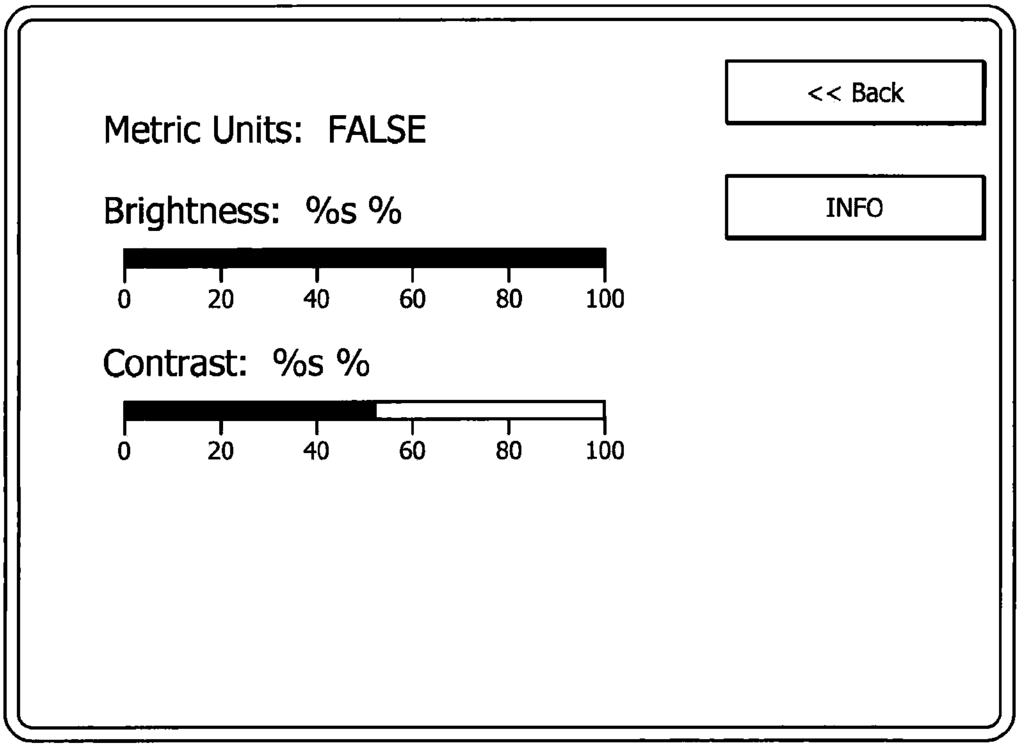
FIG. 10E is a fifth display screen.

FIG. 10A depicts information displayed by display 88 when an operator has selected a "parameters" mode. FIGS. 10B-D depict additional display screens used for control and diagnostics of the machine. FIG. 10E is used to set the system units of display, metric or U.S. customary.

There are many variations that could be made to the structure as disclosed. For example, the encoder could also be directly driven, or even included as an integral part of the hydraulic motor or swivel.

It will thus be seen that the objects set forth above, and those made apparent from the foregoing disclosure, are efficiently attained and since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A control apparatus for a machine that cleans drums of a ready mixed concrete truck, comprising:

a rotary encoder having an output shaft;

an encoder sprocket mounted on said rotary encoder output shaft for conjoint rotation therewith;

a bi-directional motor having an output shaft;

a bi-directional motor sprocket mounted on said bi-directional motor output shaft for conjoint rotation therewith;

a nozzle lance including a nozzle adapted to discharge water under high pressure, said nozzle lance adapted for fluid communication with a source of water under high pressure;

a swivel assembly having an output shaft to which said nozzle lance is mounted for reciprocating movement in a substantially vertical plane about a horizontal axis;

a swivel assembly sprocket mounted to said swivel assembly output shaft for conjoint rotation therewith;

said bi-directional motor sprocket and said swivel assembly sprocket being laterally disposed in relation to one another;

a sprocket chain that meshingly engages said bi-directional motor sprocket and said swivel assembly sprocket to form a loop-shaped path of travel so that said sprocket chain rotates in a first direction when said bi-directional sprocket and said swivel assembly sprocket rotate in a first direction and in a second direction opposite to the first direction when said bi-directional sprocket and said swivel assembly sprocket rotate in a second direction opposite to the first direction;

said encoder sprocket meshingly engaging said sprocket chain;

a programmable logic controller in electrical communication with said bi-directional motor and said rotary encoder;

an elongate boom and a housing through which said elongate boom extends;

a bi-directional motor mounted on said housing and having an output shaft;

a boom position rotary encoder mounted on said output shaft for conjoint rotation therewith;

a pinion gear mounted on said output shaft;

a rack gear mounted to said elongate boom and said rack gear meshingly engaged to said pinion gear so that rotation of said pinion gear in a first direction effects linear motion of said elongate boom in a first direction and rotation of said pinion gear in a second direction effects linear motion of said elongate boom in a second direction opposite to said first direction;

a programmable logic controller in electrical communication with said bi-directional motor and said rotary encoder;

whereby an operator controls the rate of oscillation of said nozzle lance by inputting a desired stroke rate into the PLC, said PLC comparing a measured oscillation as reported by said rotary encoder and comparing said measured oscillation with a desired stroke rate and adjusting the hydraulic valve accordingly to speed up or slow down the measured oscillation so that said measured oscillation changes to the desired oscillation;

whereby an operator controls the range of oscillation of said nozzle lance by inputting a desired stroke range into the PLC, said PLC comparing a measured range as reported by said rotary encoder and comparing said measured range with a desired stroke range and adjusting the hydraulic valve accordingly to increase or decrease the measured range so that said measured range changes to the desired range; and whereby an operator controls extension and retraction of said elongate boom by inputting a desired extension or retraction rate into the PLC, said PLC comparing a measured extension or retraction rate as reported by said rotary encoder and comparing said measured extension or retraction rate with a desired extension or retraction rate and adjusting said bi-directional motor accordingly to speed up or slow down the measured extension or retraction rate so that said measured extension or retraction rate changes to the desired extension or retraction rate.

2. The control apparatus of claim 1, further comprising:

said bi-directional motor selected from a group of motors including a hydraulic motor, a pneumatic motor, an electric motor and an electric servo motor.

3. The control apparatus of claim 1, further comprising:

a human-machine interface;

said human-machine interface including a programmable logic controller, a wireless receiver, a printed circuit board, and a visual display.

* * * * *